United States Patent [19]

Eke et al.

[11] Patent Number: 4,958,660

[45] Date of Patent: Sep. 25, 1990

[54] CLOSED LOOP FUNCTION SELECTOR VALVE

[76] Inventors: Daniel A. Eke, 234 Amber Lake Dr.; Alan B. Eke, 179 Bellevue Rd., both of Fairmont, Minn. 56031; Earl W. Johnson, R.R. 1, Dunnell, Minn. 56127

[21] Appl. No.: 476,134

[22] Filed: Feb. 6, 1990

Related U.S. Application Data

[63] Continuation of Ser. No. 121,299, Nov. 15, 1987, abandoned.

[51] Int. Cl.$^5$ .......................... F16K 11/12; A47K 3/22
[52] U.S. Cl. .......................... 137/625.23; 137/625.11; 4/194; 4/540
[58] Field of Search ...................... 137/625.11, 625.23; 4/194, 540

[56] References Cited

U.S. PATENT DOCUMENTS

| | | | |
|---|---|---|---|
| 825,370 | 7/1906 | Zurbuch | 137/625.23 |
| 2,202,961 | 6/1940 | Parker | 137/625.24 X |
| 2,374,714 | 5/1945 | Turchan et al. | 137/625.23 |
| 2,536,540 | 1/1951 | Davis | 4/540 |
| 2,541,263 | 2/1951 | Mayo et al. | 4/540 |
| 2,700,984 | 2/1955 | Gleasman | 137/625.24 X |
| 3,014,499 | 12/1961 | Barksdale | 137/625.23 X |
| 3,021,869 | 2/1962 | Ross | 137/625.24 |
| 3,115,160 | 12/1963 | Rogers | 137/625.24 X |
| 3,174,160 | 3/1965 | Fielding | 4/540 |
| 3,199,539 | 8/1965 | Leathem | 137/625.24 |
| 3,253,678 | 5/1966 | Osmond | 137/625.11 X |
| 3,650,295 | 3/1972 | Smith | 137/625.24 X |
| 3,827,087 | 8/1974 | Cuthbertson | 4/540 |
| 3,889,304 | 6/1975 | Loren | 4/563 |
| 3,924,278 | 12/1975 | Ekman | 4/540 |
| 4,096,882 | 6/1978 | Yano et al. | 137/625.24 X |
| 4,109,682 | 8/1978 | Gudjonsson | 137/625.24 X |
| 4,207,629 | 6/1980 | Kagawa | 4/540 |
| 4,308,892 | 1/1982 | Van Ausdal | 137/625.24 X |
| 4,342,332 | 8/1982 | Lapp | 137/625.24 X |
| 4,475,572 | 10/1984 | Brausfeld et al. | 137/625.23 |

FOREIGN PATENT DOCUMENTS 2526699 12/1976 Fed. Rep. of Germany .................. 137/625.24

*Primary Examiner*—Edward K. Look
*Assistant Examiner*—George Kapsalas
*Attorney, Agent, or Firm*—Palmatier & Sjoquist

[57] ABSTRACT

A closed loop function selector valve which directs high pressure hydraulic fluid to any one of several hydraulic related devices wherein the low pressure drains or returns of all of the devices are directed back to the valve. The valve comprises a hollow valve body having a cylindrical or arcuate inside surface wherein function selector ports are located. A valve drain output port is also located within the valve body. A selector rotor is moveably seated within the valve body having a line pressurized chamber therein which is in flow communication with the pressurized hydraulic line pressure directed into the valve. A chamber exit port is located in the body portion of the selector rotor arranged to be sealably alignable with one of the function selector ports for directing the hydraulic line pressure to any one of the various hydraulic devices connected to a functional selector port. The valve drain output port is always in flow communication with the remaining function selector ports.

6 Claims, 6 Drawing Sheets

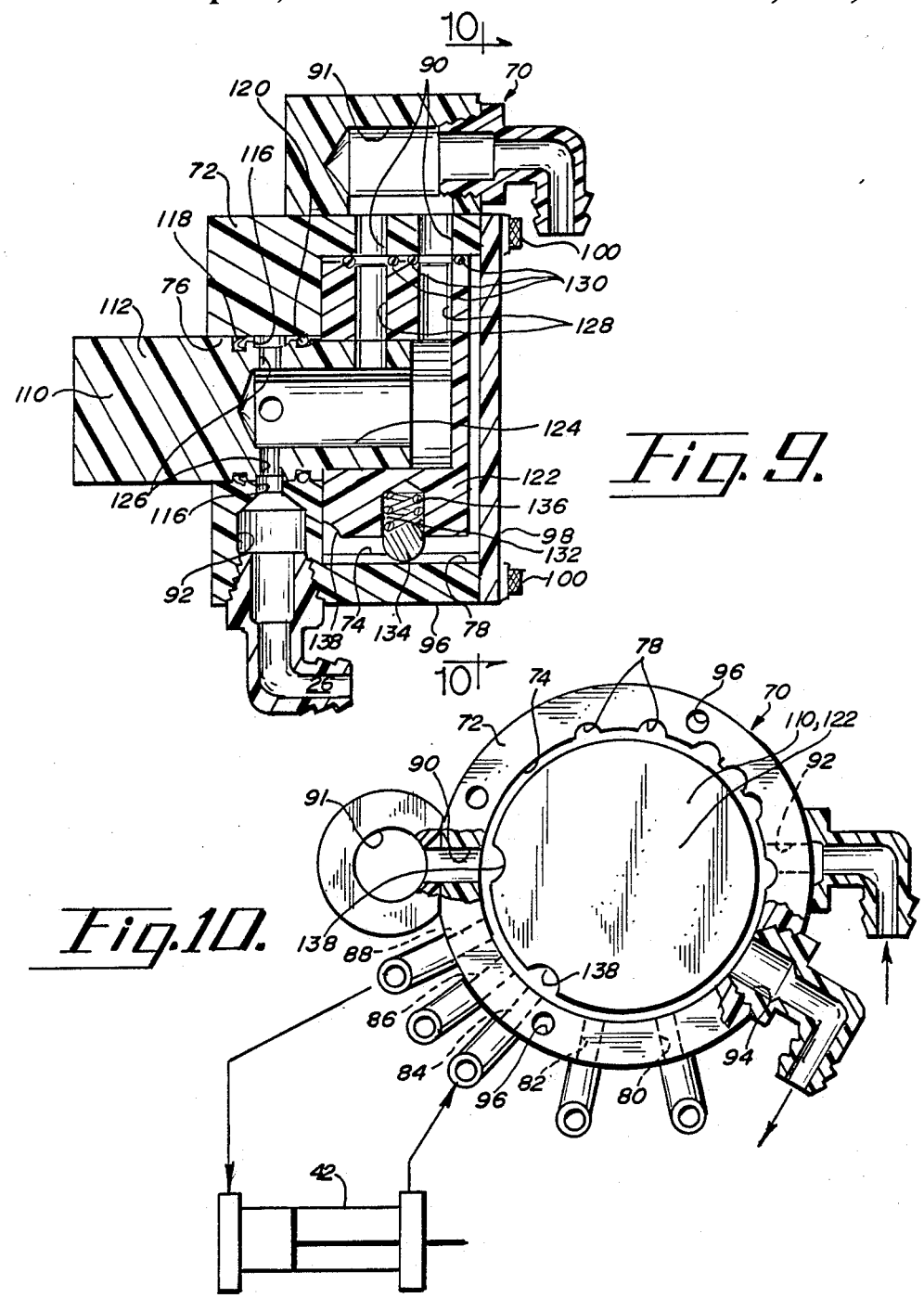

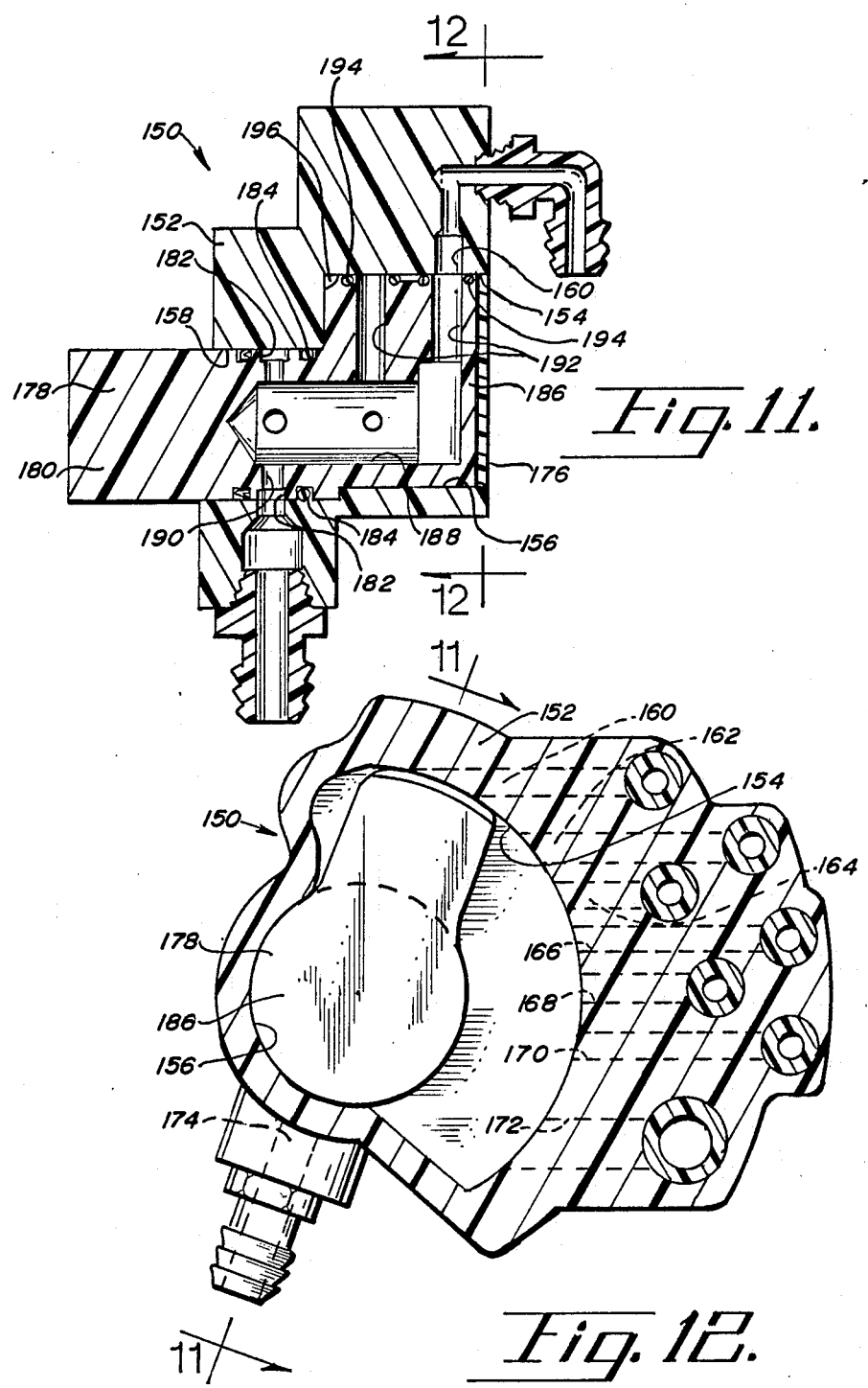

CLOSED LOOP FUNCTION SELECTOR VALVE

This is a continuation of co-pending application Ser. No. 121,299, filed on Nov. 15, 1987, now abandoned.

BACKGROUND OF THE INVENTION

This invention relates to a closed loop function selector valve which selectively directs hydraulic fluid pressure to any one of several hydraulic related devices wherein the low pressure drain or return of each of the connected devices is directed back through the valve.

Known prior methods of directing hydraulic pressure to several hydraulic devices typically involved a combination of spool and shut-off style valves. For ease of illustration and understanding, the prior art and this invention will be explained as used in a tilting bathtub for invalid care. It should be understood that application of the present invention is for illustration purposes not exclusive for such use as there may be many applications for this unique valve. Tilting bath tubs, as described in this nonexclusive valve application, may be viewed in detail in U.S Pat. Nos. 3,174,160; 3,924,278; 4,207,629; 2,536,540; 2,541,263; 3,889,304; and 3,827087.

The functional operation of such tilting bath tubs may readily be powered by ordinary or household water line pressure which may range from 40 to 80 pounds per square inch (psi). Such functions may include tilting the empty tub forward for loading the invalid; tilting the tub backward to a horizontal bathing position; opening the tub drain to permit water tempering; tempering the tub water with the combination of cold and hot water lines; closing the tub drain; filling the tub with tempered bath water; opening the tub drain; and tilting the empty tub forward to facilitate the invalid's exit from the tub.

Referring to FIG. 1, known prior methods to perform these hydraulically activated functions or operations would require four valves--two spools 28, 36 and two shut-off valves 44, 48.

Hydraulic fluid pressure with continuous line pressure to each valve is derived from household cold water line 10 and hot water line 12 which are directed into mixing valve 14 which has a cold water input 16 and a hot water input 18 and a mixed or tempered water output 20. The tempered water is then directed through thermometer manifold 22 through mixed input 24 wherein the temperature is measured to assure the proper operation of the mixing valve 14. The mixed output 26 of thermometer manifold 22 is then directed or is in flow communication with tilt spool valve 28, drain spool valve 36, temper shut-off valve 44, and fill shut-off valve 48.

Tilt spool valve 28 has a pressure input 30 and a release output 32, which are reversible, connected to lift cylinder 34. Drain spool valve 36, which includes reversible pressure input 38 and release output 40, is connected to drain cylinder 42. Temper shut-off valve 44 is in flow communication with drain 46. Fill shut-off valve 48 is directed to tub 50. By this arrangement, the above mentioned functions may be performed with the combination of these four valves and hydraulic fluid or conventional water line pressure.

Referring to FIG. 2, the present invention is schematically shown in a similar application as the known prior arrangement shown in FIG. 1. Cold water line 10 and hot water line 12 are connected to the cold input 16 and hot input 18 of mixing valve 14 with mixed output 20. The mixed output 20 is directed through thermometer manifold 22 via mixed input 24 afterwhich it leaves manifold 22 through mixed output 26 directed solely to valve high pressure line input port 92 of closed loop function selector valve 60 which in turn directs the high pressure fluid or water to any of the following: forward tilt function port 80; backward tilt function port 82; open drain function port 84; temper water function port 86; closed drain function port 88 or fill tub function port 90. Such function ports are respectively in flow communication with the lift cylinder 34, drain cylinder 42, drain 46 and bathtub reservoir 50.

BRIEF DESCRIPTION OF THE DRAWINGS

FIG. 9 is a cross-sectional view of the valve taken along lines 9—9 of FIG. 5;

FIG. 10 is a top view of the valve with the rotor cap removed taken along lines 10—10 of FIG. 9;

FIG. 11 is a cross-sectional view of an injection molded version of the selector valve taken along lines 11—11 of FIG. 12;

FIG. 12 is a cross-sectional view of the injection molded selector valve taken along lines 12—12 of FIG. 11.

SUMMARY OF THE INVENTION

Figure 1:
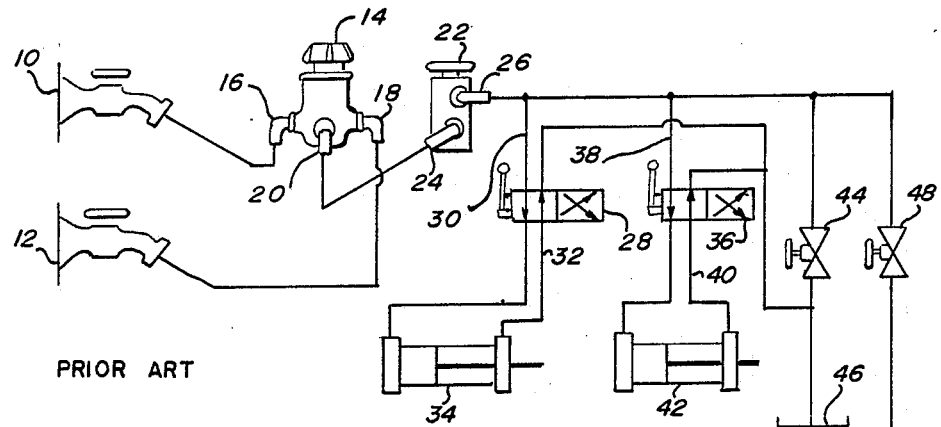
FIG. 1 is a schematic view of the known prior method of achieving similar results of the present invention.
Figure 2:
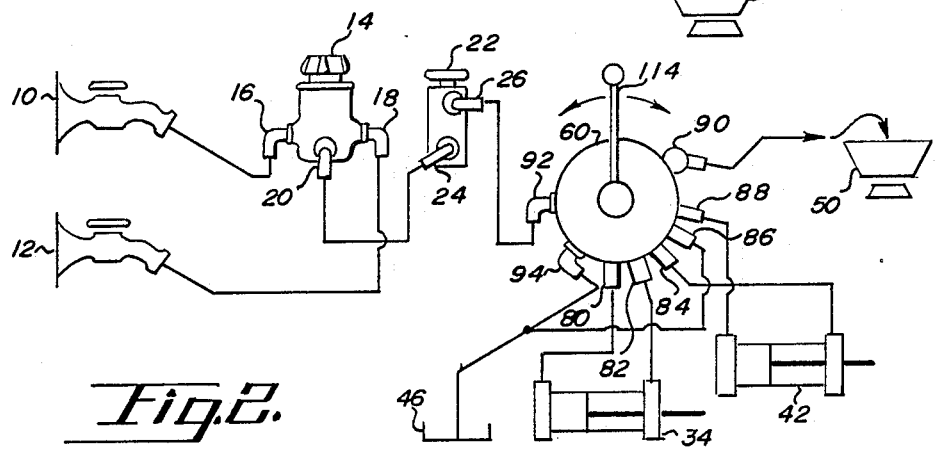
FIG. 2 is a schematic outline of the present invention in a proposed operation.
Figure 3:
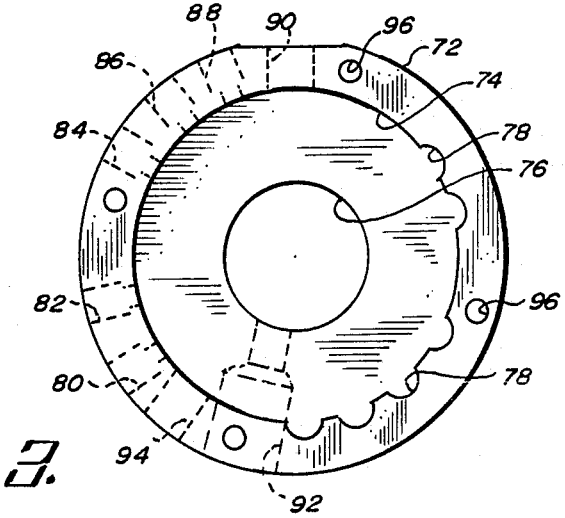
FIG. 3 is a top view of the valve body.
Figure 4:
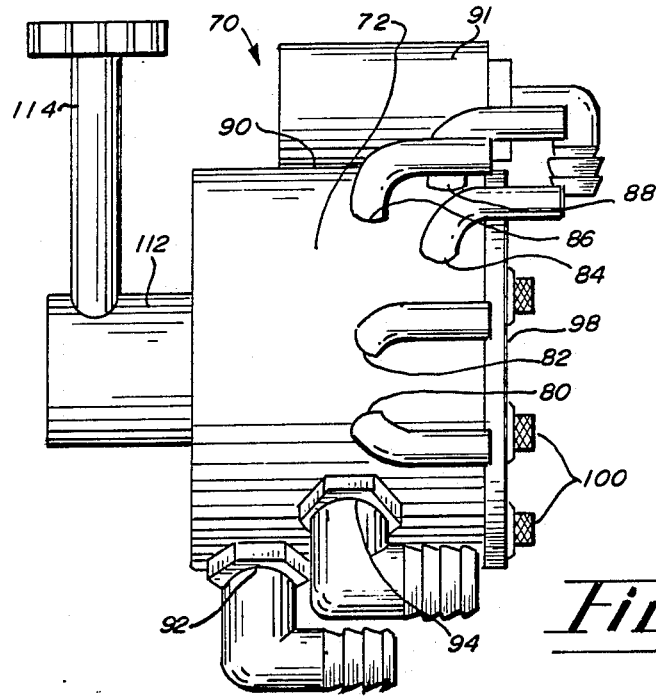
FIG. 4 is a side elevational view of the selector valve.
Figure 5:
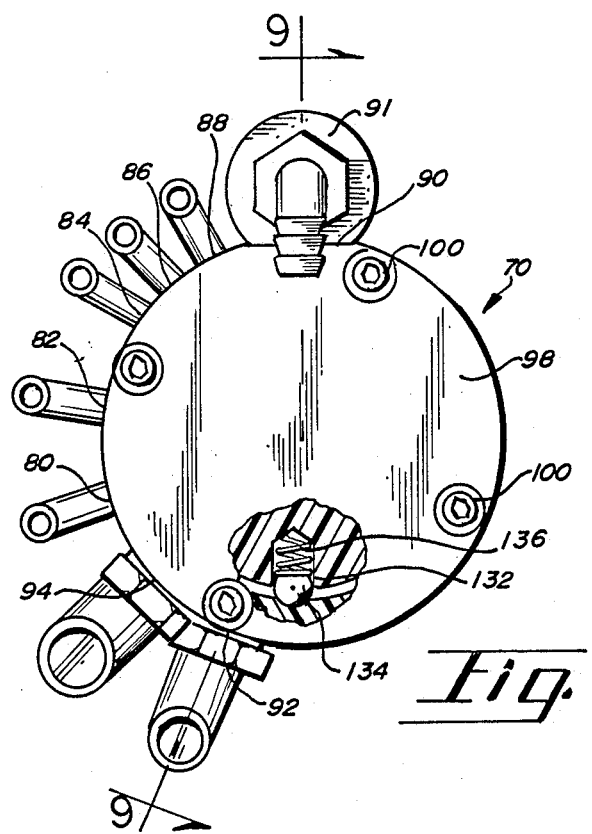
FIG. 5 is a top view of the selector valve.
Figure 6:
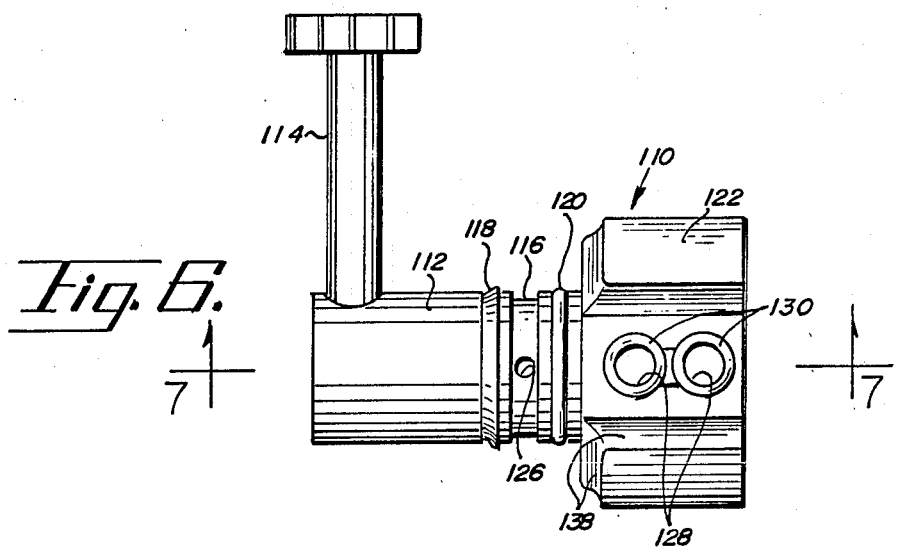
FIG. 6 is a side elevational view of the selector rotor of the present valve.
Figure 7:
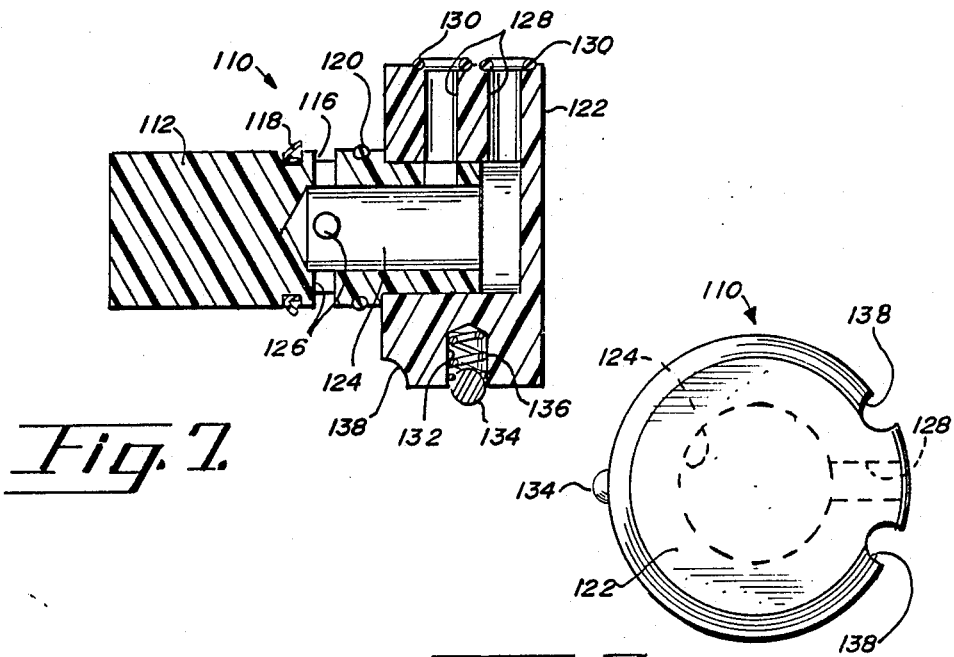
FIG. 7 is a cross-sectional view of the selector rotor taken along lines 7—7 of FIG. 6.
Figure 8:
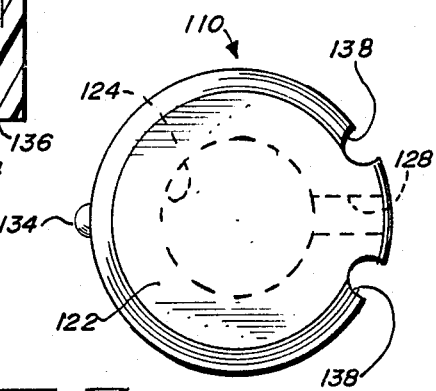
FIG. 8 is a top view of the selector rotor.

A closed loop function selector valve which directs high pressure hydraulic fluid to any one of several hydraulic related devices wherein the low pressure drains or returns of all of the devices are directed back to the valve. The valve comprises a hollow valve body having a cylindrical or arcuate inside surface wherein function selector ports are located. A valve drain output port is also located within the valve body. A selector rotor is moveably seated within the valve body having a line pressurized chamber therein which is in flow communication with the pressurized hydraulic line pressure directed into the valve. A chamber exit port is located in the body portion of the selector rotor arranged to be sealably alignable with one of the function selector ports for directing the hydraulic line pressure to any one of the various hydraulic devices connected to a functional selector port. The valve drain output port is always in flow communication with the remaining function selector ports.

The present invention advantageously provides a closed loop function selector valve with a single control lever which operates easily and replaces multiple combinations of spool and shut off valves and which readily directs fluid pressure to various hydraulic devices while yet permitting the drain or low pressure side of the devices to be directed back through the valve.

The present valve is unique in that all leaks within the valve are directed to the drain. The valve is anticipated to have long life because hydraulic pressures are localized within the overall valve thereby reducing force upon the valve itself. The valve is compact and simple to operate which will not permit multiple devices to operate simultaneously.

The present valve is cost efficient to manufacture, simple in design, and can be readily machined out of polyvinylchloride (pvc) or ejection molded to make it corrosion resistant.

DETAILED DESCRIPTION OF THE INVENTION

The closed loop function selector valve 60 may be of the following designs: a rotary machine 70 (FIGS. 3–10), injection molded 150 (FIGS. 11 and 12) or a linear piston 200 (FIG. 13)—although other styles are apparent from this specification and the claims.

Referring to FIGS. 3–10, the rotary machine selector valve 70 may be readily seen. Valve body 72 is suitably cylindrical and hollow having a cylindrical inside surface 74, rotor shaft opening 76 and detent grooves 78. Within the cylindrical inside surface 74 and diametrically opposed to their respective detent grooves 78 are forward tilt function port 80, backward tilt function port 82, open drain function port 84, temper water function port 86, close drain function port 88, and fill tub function port 90 with fill manifold 91.

Adjacent to shaft opening 76 is valve hydraulic pressure line input port 92. Also, within valve body 72 is valve drain output port 94 which suitably may be connected to a drain or returned to the source of the high pressure via appropriate conduit. The top of valve body 72 has threaded holes 96 therein whereat rotor cap 98 may be suitably fitted for sealably closing valve body 72 by tightening threaded bolts 100 and perhaps having a gasket or silicone sealer between cap 98 and valve body 72.

Rotor 110 includes rotor shaft 112 having valve selector handle 114 affixed thereto. Around rotor shaft 112 is annular hydraulic or line input channel 116. Channel 116 is sealed from the valve body 72 and inside valve surface 74 by "U" cup seal 118 and "0" ring seal 120. Rotor body or head 122 is suitably affixed or journaled with the rotor shaft 112, or shaft 112 and body 122 may be integral.

Within rotor body 122 is line pressurized rotor chamber 124 having chamber ports 126 located within annular input channel 116. Also, within rotor body 122 are line pressure chamber exit ports 128 designed to be sealable with the cylindrical inside surface 74 of valve body 72 by the action of '0' ring seals 130 about ports 128.

Opposite or diametrically opposed to chamber exit ports 128 in rotor body 122 is detent cavity or hole 132 wherein detent ball 134 and detent spring 136 are fitted. Detent ball 134, biased by the action of spring 136, releaseably interlocks rotatable rotor 110 by the cooperation of detent ball 134 and detent grooves 78 within valve body 72 and suitably holds chamber exit ports 128 against the selected function port in a sealed manner. Drain grooves 138 are also located about rotor body 122 to assure that all of the function ports 80–92 are in flow communication with valve drain output port 94 with the exception of the particular function port aligned with chamber exit ports 128.

In operation, the various function ports 80–92 are connected to be in flow communication with any of the various hydraulic operated devices (i.e., cylinders 34, 42) or tub filling conduit (not shown). Valve high pressure line input port 92 is suitably connected to the output 26 of thermometer manifold 22. The cylindrical inside surface 74 and the inside of valve body 72 are open to drain or hydraulic return through valve drain output port 94.

Hydraulic line pressure is directed into valve 60 through valve high pressure line input port 92 which is in flow communication with annular line input channel 116 on rotor shaft 112. From input channel 116 pressurized fluid enters into pressurized rotor chamber 124 through chamber ports 126.

Rotor 110 is releasable locked into the desired position by the action of detent ball 124 and spring 136 with grooves 78 so that chamber exit ports 128 may be selectively aligned with the desired function ports 80–92, such as closed drain function port 88 as seen in FIG. 10. The remaining function ports are open or in flow communication with valve drain output port 94.

The operator simply may next grasp handle 114 to rotate rotor 110 to the next desired location for alignment of chamber exit ports 128 with another function port 80–92.

Enclosed loop function selector valve 60 also readily lends itself to injection molding as may be seen by viewing the injection molded selector valve 150 embodiment of the invention in FIGS. 11 and 12. Injection molded selector valve 150 includes valve body 152 having an arcuate port surface 154 opposing an inner selective bearing surface 156 and a selector shaft opening 158. Seven function ports 160–172 are located in the inner arcuate port surface 154. Valve body 152 also has valve line pressure input 174 and a valve drain (not shown). The valve body 152 may also have a selector cap 176.

The function selector 178 is similar to rotor 110 having a selector shaft 180 which extends through the selector shaft opening 158. Arcuate line input channel 182 is located on shaft 180 and is suitably sealed from the remainder of valve body 152 by the action of known seals 184. A selector body 186 has pressurized selector chamber 188 with chamber ports 190 in input channel 182. Pressurized chamber exit ports 192 are located on the selector body 188 and may readily be sealed against the port surface 154 by the action of "0" ring seals 194. Drain groove 196 is also provided for the purpose as previously explained. Operation of the injection molded selector valve 150 is similar to the rotary machine selector valve 70 version of the invention.

Figure 13:
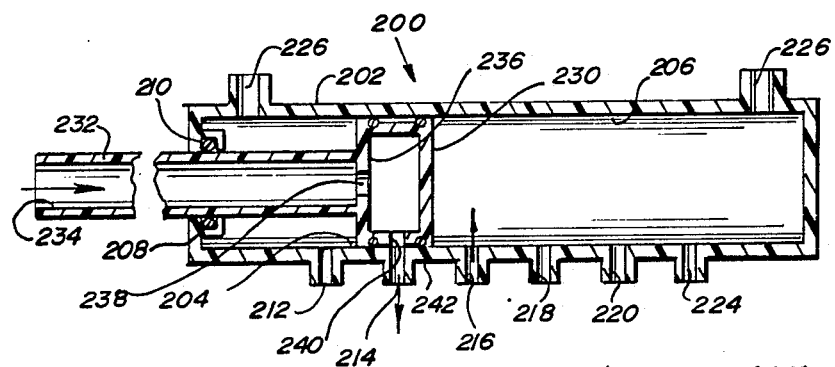
FIG. 13 is a cross-sectional view of a linear piston version of the selector valve of the present invention.

Another embodiment of the invention includes linear piston selector valve 200 which operates similarly to rotary machined selector valve 70 and injection molded selector valve 150 and may more particularly be seen in FIG. 13. Selector valve 200 includes valve body 202 having an inner port side surface 204 and an opposing piston bearing surface 206 along with a piston rod opening 208 with appropriate seals 210. The function ports 212–224 are appropriately located on the inner port side surface 204 of valve body 202 while valve drain output ports 226 are located within valve body 202 at remote locations. Piston 230 is mounted on hollow piston rod 232 which receives valve line pressure input 234 therethrough to deliver hydraulic pressure to pressurized piston chamber 236 within piston 230 through chamber port 238. Piston 230 has line pressure chamber exit port 240 suitably sealed against inner port side surface 204 by the action of '0' rings seals 242.

The present invention may be embodied in other specific forms without departing from the spirit or essential attributes thereof. Therefore, the illustrated embodiment should be considered in all respects as illustrative and not restrictive, reference being made to the appended claims rather than to the foregoing description to indicate the scope of the invention.

What is claimed is:

1. A closed loop function selector valve which directs hydraulic fluid pressure to any one of several hydraulic related devices wherein the low pressure drains or returns of all of the devices are directed back through the valve, comprising (a) a hollow valve body having a t least two function selector ports therein hydraulically connected to any of the devices, a high pressure line input port and a valve drain output port;

(b) a selector moveably seated within the valve body having a line pressurized chamber within the valve body which is in constant flow communication with the hydraulic pressure directed into the valve by way of the line input port;

(c) a chamber exit port within the selector arranged to be alignable with one of the function selector ports for flow communication therewith while the other function selector port is in flow communication with the valve rain output port within the valve body; and (d) detent means on the selector diametrically opposing the chamber exit port and within said valve body for releasably interlocking the selector into any one of its operational positions wherein the chamber exit port is in communication with one of the two function selector ports.

2. The selector valve of claim 1, further comprising a groove on the selector for readily permitting flow communication with the function selector port not aligned with the chamber exit port to facilitate low pressure drainage to the valve drain outlet port.

3. The selector valve of claim 1 wherein the selector is sealed within the hollow valve body.

4. The selector valve of claim 1, further comprising a plurality of function selector ports wherein all but one of the selector ports are in free flow fluid communication with the drain output port.

5. The selector valve of claim 1, wherein the detent means comprises grooves on the inside of the hollow valve body and a spring and ball mounted in a hole on the selector adjacent the grooves.

6. The selector valve of claim 1, wherein the selector is of an integral construction.

* * * * *

UNITED STATES PATENT AND TRADEMARK OFFICE
CERTIFICATE OF CORRECTION

PATENT NO. : 4,958,660

DATED : September 25, 1990

INVENTOR(S) : Daniel A. Eke and Alan B. Eke

It is certified that error appears in the above-identified patent and that said Letters Patent is hereby corrected as shown below:

In column 6, line 1, delete "rain" and insert --drain--.

Signed and Sealed this

Twelfth Day of January, 1993

*Attest:*

DOUGLAS B. COMER

*Attesting Officer*     *Acting Commissioner of Patents and Trademarks*